Patented June 1, 1948

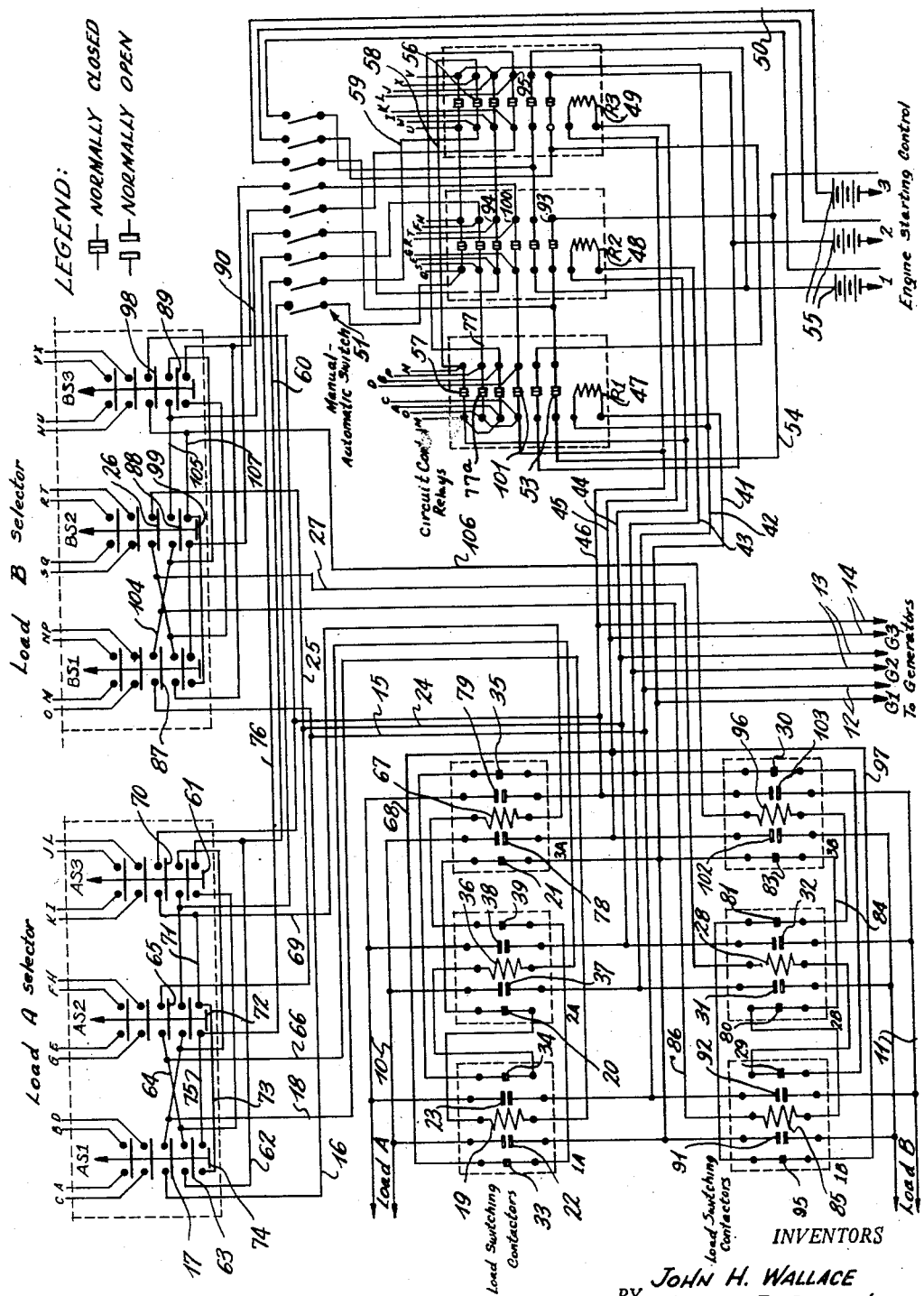

2,442,388

UNITED STATES PATENT OFFICE 2,442,388

AUTOMATIC TRANSFER PANEL

John H. Wallace, San Marino, and Alvin J. Smith, Los Angeles, Calif., assignors, by mesne assignments, to Engineering Controls, Inc., a corporation of California Application October 16, 1945, Serial No. 622,584

4 Claims. (Cl. 171—97)

This invention relates to an apparatus for automatically transferring electrical loads from one electrical generator to another.

In many situations there are two electrical loads, each of which is normally supplied with current from its own electric generator wherein the load is such that serious results follow if an electric generator supplying one of the loads fails even for a very short period of time. It has been proposed to employ two generators which normally carry the two loads and to provide a third or standby generator which can be employed to carry the load of whichever generator may fail.

An object of the present invention is to provide an apparatus which in the event of failure of one of the two generators carrying their respective loads, will promptly and automatically cause the third or standby generator to be started up and to carry the load of whichever generator may have failed.

In some instances, serious results ensue when an electrical load has its current supply cut off even for a very short fraction of time so that it is impossible to wait until the third or standby generator is brought up to speed and is in a condition to have the load of the generator that failed transferred thereto. It is, therefore, another object of the invention to provide switch gear for the purpose of transferring two loads among three generators in such a manner that neither load is dropped for a longer period of time than that required for the opening of one magnetic contactor and the closing of another, and is so arranged that in the event of failure of either generator its load is instantly transferred to the other running generator which is caused to carry both loads temporarily while the standby generator is automatically started and when the latter is developing normal potential the load from the failed generator is transferred thereto. Under such circumstances, the generator which has continued running is temporarily overloaded being required to carry both loads which may exceed the capacity for which the generator was designed. However, the time required to bring up the standby generator to speed is usually sufficiently short so that the overloading of the running generator is not disastrous. In accordance with the present invention the ratings of the three generators used will be selected sufficiently high so that the temporary overload can be carried by any generator without involving excessive voltage drop.

Still another object of the invention is to provide an apparatus wherein there are two loads and three generators, two of the generators serving to normally carry the respective loads, and the third generator serving as a standby generator and which is highly versatile in that any two of the three generators may be caused to carry either of the two loads with the remaining generator serving as a standby generator for either of the other two or working generators.

With the foregoing and other objects in view, which will be made manifest in the following detailed description and specifically pointed out in the appended claims, reference is had to the accompanying drawings for an illustrative embodiment of the invention, wherein the figure is a partial schematic wiring diagram of the apparatus embodying the present invention, some of the connections being omitted for purposes of clarity and represented merely by corresponding letters at the ends of the omitted connections.

Referring to the accompanying drawing, 10 and 11 indicate the leads of two loads represented on the drawing as load A and load B. 12, 13, and 14 indicate leads from three generators, namely generators G1, G2, and G3, two of which normally designated carry loads A and B, respectively, and the third of which serves as a standby generator which may be caused to assume either load A or load B in the event that one of the running generators should fail. Between the generators and the loads there are two banks of load-switching contactors indicated at 1A, 2A, 3A, and 1B, 2B, and 3B. Each contactor has a coil or solenoid which actuates its contacts, there being two normally open pairs of contacts and two normally closed pair of contacts associated with each coil. Each load-switching contactor serves to electrically connect its load with its respective generator, thus load-switching contactor 1A serves to connect load A with generator G1 and disconnect it therefrom. Load-switching contactor 2A serves to connect generator G2 with load A and disconnect it therefrom and load-switching contactor 3A serves to connect generator G3 with load A, and disconnect it therefrom. In a similar manner, load-switching contactor 1B, 2B, and 3B serve to connect generators G1, G2, and G3 with load B and disconnect them therefrom respectively.

As part of the apparatus there are two load selectors indicated as load A selector and load B selector. Each selector has three component switches indicated by numerals AS1, AS2, and AS3; BS1, BS2, and BS3, respectively. These switches are so arranged mechanically that only one switch may be closed in each load selector, the other two being required to be kept open. These load selectors are used to optionally control the load-switching contactors so that any two of the three generators may be optionally caused to carry the two loads A and B.

A further part of the apparatus consists of a bank of three circuit control relays each of which has a coil operable when energized to simultaneously open all of the normally closed contacts associated therewith. The various parts and terminals are electrically connected together as illustrated upon the drawing, the various connections being referred to hereinafter in the course of the description of the operation of the apparatus which is substantially as follows:

In a typical situation generator G1 is supplying electric current to load A. Generator G2 is simultaneously supplying current to load B. Generator G3 is not running and serves as a standby generator for either of generators G1 and G2. When generator G1 is operating and is electrically connected to load A, component switch AS1 of load A selector is closed, and component switches AS2 and AS3 of load A selector are held open. When generator G2 is connected to load B, component switch BS2 of load B selector is closed and component switches BS1 and BS3 of load B selector are open. Under these circumstances, a circuit is closed from one side of generator G1 through line 15, 16, closed contacts 17, line 18 to coil 19 of load-switching contactor 1A. The balance of the circuit leading through normally closed contacts 20 of load-switching contactor 2A and normally closed contacts 21 of load-switching contactor 3A, and thence to the other lead from generator G1. When coil 19 is energized two normally open contacts 22 and 23 are closed thus connecting the leads 12 of generator G1 directly to load A. In a similar manner generator G2 supplies current from one side to lines 24 and 25 to closed contacts 26 of component switch BS2 of load B selector and thence through line 27 to coil 28 of load-switching contactor 2B. The balance of the circuit is through normally closed contacts 29 of the load-switching contactor 1B and normally closed contacts 30 of load-switching contactor 3B to the other side of generator 2. Coil 28 being thus energized closes its normally open contacts 31 and 32, thus connecting generator G2 directly to load B.

Assume for purposes of illustration that under these circumstances generator G1 should fail. Upon a failure of current to reach coil 19 of load-switching contactor 1A from generator G1 this coil becomes deenergized permitting its contacts 22 and 23 to open and its normally closed contacts 33 and 34 to close. Current may then flow from generator G2 through normally closed contacts 35 of load-switching contactor 3A through closed contacts 34 to one terminal of coil 36. The current path to the other side of coil 36 will hereinafter be explained in connection with the description of the deenergizing of this coil. When coil 36 is thus energized from generator G2 it closes its normally open contacts 37 and 38 and opens normally closed contacts 20 and 39. Contacts 37 and 38 on being closed thus connect load A directly with generator G2 it being understood that generator G2 is already supplying current to load B through contacts 31 and 32.

The three generators are each also connected by lines 41, 42, 43, 44, 45, and 46 to coils 47, 48, and 49 of the circuit control relays. These circuit control relays each have a group of normally closed contacts associated therewith. During the period when generators G1 and G2 were carrying loads A and B, respectively, coils 47 and 48 were energized holding the contacts associated therewith in open position. Generator G3 being inoperative and therefore supplying no current to coil 49 this coil would be deenergized and its contacts would be closed. Upon the failure of generator G1 contacts associated with coil 47 are permitted to close as soon as coil 47 becomes deenergized so that upon the failure of generator G1 all contacts of the circuit control relays are closed with the exception of those associated with coil 48, which is in turn associated with generator G2 which is still operating. Among other functions the circuit control relays control three starting control circuits which start up the operation of the three generators. In the usual situation each generator is driven by an internal combustion engine having an automatic starting mechanism controlled by its respective starting control circuit connected thereto. It is to be understood, however, that the generators could conceivably be driven by steam power or water power, in which case the function of the starting control circuits might be merely to turn on a steam valve or open a water valve as the case may be. The failure of generator G1 results in a deenergizing of relay coil 47, causing the contacts associated therewith to return to their normally closed position. The starting control circuit governing the starting of generator 3 is thus closed, such circuit being traceable through line 50, through the manual automatic switch generally indicated at 51, line 52, contacts 53, and line 54. In each of the starting control circuits there is an independent source of power such as the three 55. With the starting control circuit for generator G3 thus closed and energized by its battery 55, generator G3 is started in operation and is brought up to normal operating conditions as soon as is reasonably possible so that the overloading or double-loading of generator G2 will be minimized to as short a period of time as possible. When generator G3 is brought up to speed it of course energizes relay coil 49, being connected thereto by lines 45 and 46. The bank of relay contacts associated with this relay coil are consequently opened. Opening of contacts 56 breaks the circuit through load-switching contactor coil 36, the circuit being traceable as follows: From line 44 through contacts 57, line 58 to contacts 56, through line 59, the manual automatic switch 51, line 60 and line 62, contacts 63 of load A selector AS1. Current flow cannot take place across contacts 61 under the assumed condition because it will be recalled that only load A selector AS1 was closed and that load A selectors AS2 and AS3 were consequently required to be kept open. However, as load A selector AS1 has remained closed regardless of the failure of generator G1, current flow could take place across contacts 63 to line 64 to line 66 to load-switching contactor coil 36, and from this coil the circuit is completed through contacts 34 and contacts 35 to the other lead from generator G2. When generator G3 has been brought up to speed load-switching contactor coil 67 is energized, the circuit being traceable from one side of generator G3 through line 68 through closed contacts 33 and closed contacts 39 which contacts will have returned to their normally closed position due to the deenergizing of coil 36. From contacts 39 the circuit continues through coil 67, line 69, and line 73 to contacts 74 of load A selector AS1 which is still closed. These contacts being closed a line 75 can continue the circuit to the other contact 72 of load A selector AS2 and thence via line 76 through the manual-automatic switch to contact T. The contacts of the circuit control relays S and T will of course be open due to the continued energizing of coil 48 by generator G2. However, contact T of circuit control relay 2 is directly connected to the corresponding contact T of load B selector BS2 and as this selector has remained closed, the circuit is completed between T and S of load B selector BS2, the S terminal being directly connected to the S terminal or contact of circuit control relay R2. From this contact line 77 leads through closed contact 77a which have been closed due to the deenergizing of coil 47 to line 46, thus completing the circuit. The energizing of load-switching contactor coil 67 which takes place substantially simultaneously with the deenergizing of coil 36 and open contacts 21 and 35 and close contacts 78 and 79, thus automatically placing generator G3 on the line and causing it to assume and carry load A.

In this manner if generators G1 and G2 are initially carrying loads A and B, respectively, and generator G1 should fail, load A is instantly and automatically connected to generator G2 so that generator G2 is for a short period of time carrying both load A and load B while generator G3 is being brought up to full operating conditions. When generator G3 has been brought up to normal load A is automatically disconnected from generator G2 and connected to generator G3 which will continue to carry this load until such time as other modifying conditions occur.

If generator G1 is repaired during the time that load A is being carried by generator G3 and it is desired to have generator G1 resume load A in place of generator G3 the mere bringing up of generator G1 to operating conditions will cause circuit control relay coil 47 to be energized which will open contacts 78 which breaks the circuit through coil 67 thus opening contacts 78 and 79 and taking generator G3 off load A. Simultaneously, on the deenergizing of coil 67 contacts 21 and 35 will again close and on the closing of contacts 21 a circuit is completed through coil 19 permitting this coil to be capable of being energized by generator G1 and to connect load A with generator G1 on the closing of contacts 22 and 23.

In the foregoing description generators G1 and G2 were assumed to be carrying loads A and B respectively, and generator G1 was assumed to fail. If generators G1 and G2 are carrying loads A and B, respectively, and generator G2 should fail a similar sequence of operations would take place. Thus, on the failure of generator G2 load-switching contactor coil 28 would be deenergized allowing its contactors 31 and 32 to open and its contacts 80 and 81 to close. On closing of contacts 80 current may flow from generator G1 through contacts 83, line 84, closed contacts 80 to coil 85, thence through line 86 and line 104 through contacts 88 of load B selector BS2, through lines 90, 105, and the manual-automatic switch 51 to contacts EF of circuit control relay R2. These contacts having been closed due to the failure of generator G2 having deenergized coil 48, current may flow through contacts IJ which remain closed as long as generator G3 is not operating. Contact J is directly connected to line 42 of generator G1 thus completing the circuit. When coil 85 is thus energized because of the failure of generator G2, generator G1 is caused to assume load B by the closing of contacts 91 and 92 so that this generator is temporarily carrying load B in addition to load A which it was initially carrying.

When the failure of generator G2 causes coil 48 to be deenergized contacts 93 were permitted to close which closes the circuit for the engine starting control of generator G3, this circuit being traceable through line 50, manual-automatic switch 51, line 52, and contacts 93. Generator G3 is consequently started up and when brought to operating condition it will energize coil 49. The opening of the normally closed contacts associated with this coil breaks the circuit through coil 85, this circuit being traceable from generator G1 through contacts 83, contacts 88, coil 85, line 86, and line 104, across contacts 88 through lines 105, 90, and the manual-automatic switch 51, thence across contacts 94 to contacts 95, and thence to line 42. The opening of contacts 95 breaking the circuit through coil 85 when generator G3 comes up to speed results in load B being taken off generator G1. Simultaneously therewith, on opening of contacts 95 load switching contactor coil 96 may be energized by generator G3, the circuit being traceable from generator G3 through line 97, contacts 95, 81, coil 96, lines 106 and 107, across contacts 99 of load B selector BS2 through the manual-automatic switch 51 and contacts 100 which will then have been closed due to the deenergizing of coil 48 on account of the failure of generator G2. The circuit then continues to terminals CD of contacts associated with coil 47. These terminals are directly connected to contacts CD of load A selector AS1 which still stands in closed position so that, although contacts 101 between terminals CD of circuit relay R1 are open, the circuit is completed through load A selector AS1 to terminal C in circuit control relay R1 to line 46. The energizing of coil 96 closes contacts 102 and 103 and opens contacts 83 and 30, thus causing generator G3 to assume load B. If generator G2 is then repaired and started up in operation it will automatically disconnect generator G3 from load B and assume load B itself. Thus, when generator G2 is brought up to operating conditions coil 48 will on being energized open contacts 100 which are in circuit with coil 96 as previously explained, and when the circuit of coil 96 is thus broken generator G3 will be taken off of load B on the opening of contacts 102 and 103. The closing of contacts 30 closes the circuit through coil 28 so that this coil may again be energized by generator G2 to cause generator G2 to again be connected with load B on the closing of contacts 31 and 32.

The foregoing description has been based on the assumption that generator G1 is normally connected to load A and generator G2 normally connected to load B with generator G3 acting as a standby generator for generators G1 and G2 susceptible of being optionally connected to either load A or load B depending on whether generator G1 failed or generator G2 failed. For such purpose only a portion of the apparatus illustrated would be required, it being obvious that only load selectors AS1 and BS2 having been utilized in the description so far. By using two banks of three load selectors as illustrated, the arrangement is quite versatile in that any two of the three generators may be used to carry either of the two loads with the third generator functioning as a standby generator. Thus, in the load A selector bank if load A selector AS2 will be connected to normally carry load A and if load A selector AS3 is closed in lieu of AS2, generator G3 will be normally connected to carry load A. Likewise, in the load B selector bank the closing of any one of the three selectors will connect the corresponding generator to load B. Regardless of which generators are normally connected by their selectors to the two loads, failure of a loaded generator serves to cause the other loaded generator to instantly assume both loads temporarily while the standby generator is started and brought up to normal operating speed. The failure of a loaded generator causes its circuit control relay to close a circuit through the engine starting control circuit of the standby generator to start up the standby generator and when the standby generator is brought up to speed the contacts that connect the loaded generator that has not failed and which is carrying the second load to open so that the generator that has not failed may thereafter continue to carry only its own load. The standby generator is automatically connected to the load of the generator that failed.

The specific manner in which the foregoing is accomplished on the assumption that other generators are normally carrying loads A and B besides generators G1 and G2 are not described herein for the sake of brevity. They may be traced, however, on various assumed conditions in a manner similar to that previously described in connection with the wiring diagram. It should be kept in mind, however, that all lettered contacts or terminals on the circuit control relays are connected directly to the correspondingly lettered points on the load selector banks which, when the load selectors are closed, provide or close shunt circuits around contacts of the circuit control relays when these contacts would be open and when it is necessary to complete the circuit across them.

In the above-described switch gear the presence of the auxiliary contacts 33, 34, 20, 39, 21, 35, 95, 29, 80, 81, 83, and 30 on the load switching contactors prevents the closing of more than one generator to either load. Consequently, it is impossible to parallel two generators to the same load.

Various changes may be made in the details of construction without departing from the spirit and scope of the invention as defined by the appended claims.

We claim:

1. In combination, two electrical loads and three generators, means normally connecting two of the three generators to their respective loads, means operable by the failure of one of the loaded generators for causing the other loaded generator to assume its load, and means operable by the third generator coming up to normal operating conditions for disconnecting the assumed load from the loaded generator and causing the third generator to be connected to the assumed load.

2. In combination, two electrical loads and three generators, two of which are normally connected to their respective loads, means operable by the failure of one of the loaded generators for causing its load to be assumed by the other loaded generator, means operable by the failure of the mentioned generator for starting up the third generator, and means operable upon the third generator coming up to speed for disconnecting the assumed load from the loaded generator and connecting it to the third generator.

3. In combination, a pair of electrical loads, three generators, two of which are adapted to be normally connected to the two loads respectively, load-switching contactors for connecting the generators to the loads, load selectors for controlling the load-switching contactors and circuit control relays operatively connected to the load-switching contactors and load selectors in such a manner that upon failure of one loaded generator its load will be temporarily assumed by the other loaded generator and upon the third generator becoming capable of assuming a load, the assumed load will be disconnected from the loaded generator and automatically connected to the third generator.

4. In combination, a pair of electrical loads, three generators, two of which are adapted to be normally connected to the two loads respectively, load-switching contactors for connecting the generators to the loads, load selectors for controlling the load-switching contactors and circuit control relays operatively connected to the load-switching contactors and load selectors in such a manner that upon failure of one loaded generator its load will be temporarily assumed by the other loaded generator and upon the third generator becoming capable of assuming a load, the assumed load will be disconnected from the loaded generator and automatically connected to the third generator, the load selectors being characterized by closing shunt circuits across contacts of circuit control relays.

JOHN H. WALLACE.
ALVIN J. SMITH.

REFERENCES CITED

The following references are of record in the file of this patent:

UNITED STATES PATENTS

| Number | Name | Date |
| --- | --- | --- |
| 1,793,384 | Anderson | Feb. 17, 1931 |